US010286952B2

(12) United States Patent
Takaso et al.

(10) Patent No.: US 10,286,952 B2
(45) Date of Patent: May 14, 2019

(54) VEHICLE TRAVELING CONTROL APPARATUS

(71) Applicant: SUBARU CORPORATION, Tokyo (JP)

(72) Inventors: Yasushi Takaso, Tokyo (JP); Fumihito Yamaguchi, Tokyo (JP); Koji Matsuno, Tokyo (JP); Masayuki Yajima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 167 days.

(21) Appl. No.: 15/369,288

(22) Filed: Dec. 5, 2016

(65) Prior Publication Data

US 2017/0158238 A1 Jun. 8, 2017

(30) Foreign Application Priority Data

Dec. 7, 2015 (JP) ................................. 2015-238722

(51) Int. Cl.
*G05D 1/02* (2006.01)
*B60W 30/10* (2006.01)
*B62D 15/02* (2006.01)

(52) U.S. Cl.
CPC .......... *B62D 15/026* (2013.01); *B60W 30/10* (2013.01); *G05D 1/0246* (2013.01); *G05D 2201/0213* (2013.01)

(58) Field of Classification Search
CPC .............. B62D 15/026; G05D 1/0246; G05D 2201/0213
USPC ......................................................... 701/41
See application file for complete search history.

(56) References Cited

U.S. PATENT DOCUMENTS

2006/0235598 A1* 10/2006 Kudo .................. B62D 15/026
701/96
2009/0216405 A1 8/2009 Kudo
2013/0080019 A1* 3/2013 Isaji ..................... B60W 30/16
701/96

(Continued)

FOREIGN PATENT DOCUMENTS

DE  10 2007 050189 A1  4/2009
JP      2004-322916 A   11/2004

OTHER PUBLICATIONS

Chinese Office Action issued in corresponding Chinese Patent Application No. 201611093780, dated Jul. 20, 2018, with English Translation.

(Continued)

*Primary Examiner* — Krishnan Ramesh
(74) *Attorney, Agent, or Firm* — McDermott Will & Emery LLP

(57) ABSTRACT

A vehicle traveling control apparatus includes a first setting unit and a correcting unit. The control target point setting unit sets a set position of a preceding vehicle ahead of an own vehicle in a vehicle width direction as a control target point of follow-up traveling for traveling while following the preceding vehicle. The steering control amount correcting unit corrects, on a basis of deviation between a target steering angle that brings the own vehicle to the control target point and an actual steering angle, an amount of a steering control that controls the own vehicle to the target steering angle which is a steering angle that brings the own vehicle to the control target point.

5 Claims, 5 Drawing Sheets

(56) References Cited

U.S. PATENT DOCUMENTS

| | | | |
|---|---|---|---|
| 2015/0367854 A1* | 12/2015 | Ezoe | B60W 30/14 |
| | | | 701/1 |
| 2016/0059881 A1* | 3/2016 | Hornberger | B62D 1/283 |
| | | | 701/24 |
| 2018/0024354 A1* | 1/2018 | Shibata | B60K 35/00 |
| | | | 345/7 |
| 2018/0170384 A1* | 6/2018 | Masui | B60R 21/00 |
| 2018/0240258 A1* | 8/2018 | Kosaka | G06T 3/40 |

OTHER PUBLICATIONS

German Office Action issued in corresponding German Patent Application No. 10 2016 122 819.2, dated Nov. 22, 2018, with English Translation.

\* cited by examiner

VEHICLE TRAVELING CONTROL APPARATUS

CROSS-REFERENCE TO RELATED APPLICATIONS

The present application claims priority from Japanese Patent Application No. 2015-238722 filed on Dec. 7, 2015, the entire contents of which are hereby incorporated by reference.

BACKGROUND

The technology relates to a vehicle traveling control apparatus that controls follow-up traveling allowing for traveling while following a preceding vehicle ahead of an own vehicle.

In recent years, in vehicles such as automobiles, a follow-up traveling system has been known in which an own vehicle travels while following a preceding vehicle traveling ahead of the own vehicle. As disclosed in Japanese Unexamined Patent Application Publication No. 2004-322916, the follow-up traveling system to follow a preceding vehicle automatically controls a steering wheel, a transmission, an engine, and a brake by capturing the preceding vehicle with a radar or a camera, for example. The follow-up traveling system is effective in a case of traveling a road without a lane marker or a white line on a surface of the road. The follow-up traveling system is effective as well in a case where, during low-speed traveling in traffic jam or in other situations, an inter-vehicle distance between the own vehicle and the preceding vehicle decreases to limit the front visual field, which makes it difficult to recognize a lane line such as a white line during low-speed traveling in traffic jam or in other situations.

SUMMARY

The above-mentioned follow-up traveling system typically adopts, as a control target point, a center position of a preceding vehicle in a vehicle width direction, and controls such that a center position of an own vehicle in a width direction coincides with the control target point. The center position of the preceding vehicle may be calculated by observing a rear region of the preceding vehicle.

When the preceding vehicle to be followed is a vehicle smaller than the own vehicle, however, the smaller vehicle is more likely to be affected by disturbance due to factors such as vehicle weight and gravity center. Thus, it is probable that the smaller vehicle may travel in a meandering manner or may swerve toward a road shoulder or an opposite lane.

Accordingly, when the own vehicle travels while following the vehicle smaller than the own vehicle, a movement of the own vehicle may become oversensitive compared with a case of traveling while following a vehicle equal to or larger than the own vehicle, causing behaviors such as meandering and swerving to be more conspicuous, which may end up in giving a sense of anxiety to a driver.

It is desirable to provide a vehicle traveling control apparatus that makes it possible to suppress an unnecessary behavior of an own vehicle caused by a behavior of a preceding vehicle, during traveling while following the preceding vehicle.

An aspect of the technology provides a first vehicle traveling control apparatus including a first setting unit that sets a set position of a preceding vehicle ahead of an own vehicle in a vehicle width direction as a control target point of follow-up traveling allowing for traveling while following a preceding vehicle, and a correcting unit that corrects, on a basis of deviation between a target steering angle that brings the own vehicle to the control target point and an actual steering angle, an amount of a steering control that controls the own vehicle to the target steering angle, the target steering angle being a steering angle that brings the own vehicle to the control target point.

An aspect of the technology provides a second vehicle traveling control apparatus including a first setting unit that sets a set position of a preceding vehicle ahead of an own vehicle in a vehicle width direction as a control target point of follow-up traveling allowing for traveling while following the preceding vehicle, and a second setting unit that sets, on a basis of shape data of the preceding vehicle, a dead zone for a steering control that steers the own vehicle to the control target point.

DETAILED DESCRIPTION

Figure 1:
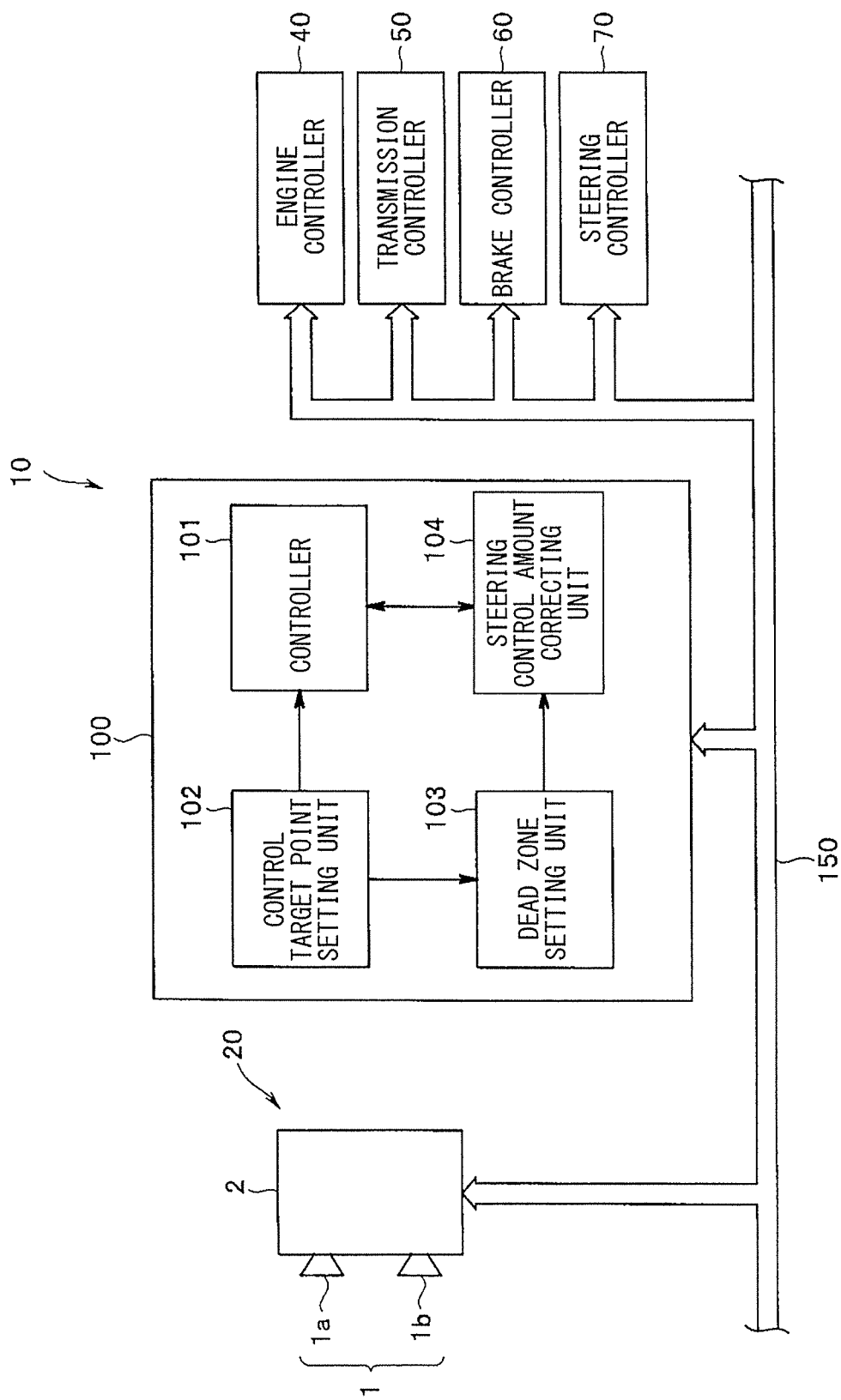
FIG. 1 is a configuration diagram illustrating a traveling control system.

In the following, some implementations of the technology are described with reference to the accompanying drawings. A traveling control system 10 illustrated in FIG. 1 may be directed to a vehicle such as an automobile. The traveling control system 10 may perform traveling control including vehicle autonomous automatic driving. The traveling control system 10 may include, for example, a traveling controller 100 as a center unit, an outside environment recognizer 20, an engine controller 40, a transmission controller 50, a brake controller 60, and a steering controller 70, which may be coupled with one another via a communication bus 150 that forms an intra-vehicle network.

The outside environment recognizer 20 may recognize an outside environment around an own vehicle using various devices such as, but not limited to, an on-vehicle camera, a millimeter-wave radar, and a laser radar. In an implementation of the technology, as the outside environment recognizer 20, an on-vehicle camera 1 and an image recognizer 2 are adopted to mainly describe recognition of the outside environment by the on-vehicle camera 1 and the image recognizer 2.

In an implementation of the technology, the camera 1 may be a stereo camera including two cameras 1a and 1b that capture images of the same object from different points of view. The cameras 1a and 1b may be shutter-synchronized cameras each including an imaging device such as a chargecoupled device (CCD) and a complementary metal oxide semiconductor (CMOS). The cameras 1a and 1b may be disposed with a predetermined base line length in vicinity of a rear-view mirror on inner side of a windshield, in an upper part of vehicle interior, for example.

A pair of right and left images captured by the camera 1 may be processed by the image recognizer 2. The image recognizer 2 may determine a pixel offset amount (parallax) between the right and left images at a corresponding position by a stereo matching processing, and may convert the pixel offset amount into data such as luminance data to generate a distance image. A point on the distance image may be coordinate-transformed, on principle of triangulation, to a point in a real space having an X-axis as a vehicle width direction, i.e., a right-left direction of the own vehicle; a Y-axis as a vehicle height direction; and a Z-axis as a vehicle length direction, i.e., a distance direction. Thus, a lane line such as a white line on a road on which the own vehicle is traveling, an obstacle, a vehicle traveling ahead of the own vehicle, or other objects may be three-dimensionally recognized.

The white line as an example of a lane line is recognizable by extracting, from the image, a group of points that may be a proposed white line, and calculating a straight line or a curve that connects the proposed points. For example, in a white line detection region set on the image, an edge may be detected whose luminance is varied by a predetermined value or more on a plurality of search lines set in a horizontal direction (vehicle width direction) to detect a set of a white line start point and a white line end point for each search line. Thus, a middle region between the white line start point and the white line end point may be extracted as a proposed white line point.

Thereafter, time-series data of a spatial coordinate position of the proposed white line point may be obtained on the basis of the vehicle movement amount per unit time. The obtained time-series data may be processed to calculate a model approximate to the right white line and the left white line. This calculated model allows the white line to be recognized. As the approximate model of the white line, an approximate model of coupled linear components determined by Hough transform, an approximate model of a curve such as a quadratic, or any other suitable approximate model may be used.

The engine controller 40 may control the driving state of an unillustrated engine on the basis of signals from various sensors that detect an engine driving state and various control information transmitted via the communication bus 150. The engine controller 40 may perform engine control on the basis of, for example but not limited to, intake air volume, throttle opening angle, engine water temperature, intake air temperature, air-fuel ratio, crank angle, accelerator position, and other vehicle information. Non-limiting examples of the principal engine control may include fuel injection control, ignition timing control, and control of the opening angle of an electronically-controlled throttle valve.

The transmission controller 50 may control oil pressure to be supplied to an unillustrated automatic transmission on the basis of signals from sensors that detect a transmission position and a vehicle velocity, for example, or on the basis of various pieces of control information transmitted via the communication bus 150. Thus, the transmission controller 50 may control the automatic transmission in accordance with preset transmission characteristics.

The brake controller 60 may control unillustrated brake devices of four wheels independently of a braking operation performed by a driver, on the basis of, for example but not limited to, a brake switch, wheel speed of each of the four wheels, a steering angle, a yaw rate, and other vehicle information. The brake controller 60 may also perform, for example, an antilock brake system and an antiskid control by calculating braking fluid pressure to be applied to each wheel on the basis of brake force of each wheel.

The steering controller 70 may control assist torque derived from an unillustrated electric power steering motor provided in a steering system of the vehicle, on the basis of, for example but not limited to, the vehicle velocity, the steering torque based on an input received from a driver, the steering angle, the yaw rate, and other vehicle information. The steering controller 70 may also perform, in accordance with an instruction from the traveling controller 100, driving control of the electric power steering motor with a steering amount that allows for following a traveling locus of a preceding vehicle, during follow-up traveling to follow the preceding vehicle traveling ahead of the own vehicle.

Next, description is given of the traveling controller 100 as a central unit of the traveling control system 10. The traveling controller 100 may perform traveling control of the own vehicle to an advancing route along the traveling lane, and follow-up traveling control that allows for traveling while following the preceding vehicle, on the basis of recognition results of the outside environments obtained by the outside environment recognizer 20. The traveling controls may be performed on the basis of, as main units, a controller 101 and a control target point setting unit 102 of the traveling controller 100.

When no preceding vehicle ahead of the own vehicle is captured, the controller 101 may recognize a lane line such as a white line on a road to detect a traveling lane of the own vehicle, and may set an advancing route along the traveling lane. Thereafter, the controller 101 may perform traveling control by means of the engine controller 40, the transmission controller 50, the brake controller 60, and the steering controller 70 so as to allow for traveling at a set vehicle velocity on the advancing route.

When the preceding vehicle ahead of the own vehicle has been captured, the controller 101 may perform the traveling control by means of the engine controller 40, the transmission controller 50, the brake controller 60, and the steering controller 70 so as to allow for traveling at a set vehicle velocity on the advancing route while keeping a predetermined inter-vehicle distance between the own vehicle and the preceding vehicle. The controller 101 may also perform follow-up traveling control that allows for traveling while following the preceding vehicle during low-speed traveling in traffic jam or in other situations.

In the follow-up traveling to follow the preceding vehicle, the controller 101 may calculate the traveling locus of the preceding vehicle, and may perform steering control by means of the steering controller 70 to bring the own vehicle into coincidence with the traveling locus. The controller 101 may also perform travel drive control by means of the engine controller 40, the transmission controller 50, and the brake controller 60. In this case, the follow-up traveling control to follow the preceding vehicle may serve as a control that determines an advancing direction of the own vehicle by correcting a steering angle to allow the lateral position of the own vehicle within lane lines to coincide with a control target point set by the control target point setting unit 102.

The control target point may be set at a center position of a rear region of the preceding vehicle in the vehicle width direction, and the center position may be adopted as a position of the preceding vehicle to calculate the traveling locus. More specifically, for example, the center position of the rear region of the preceding vehicle may be determined from captured images of the camera 1, and the center position may be adopted as a proposed point indicating the position of the preceding vehicle to determine a proposed point for each frame on the basis of a movement amount of the own vehicle per frame in the captured images. Thereafter, a curve that approximates to a group of the proposed points may be calculated as the traveling locus of the preceding vehicle.

Figure 2:
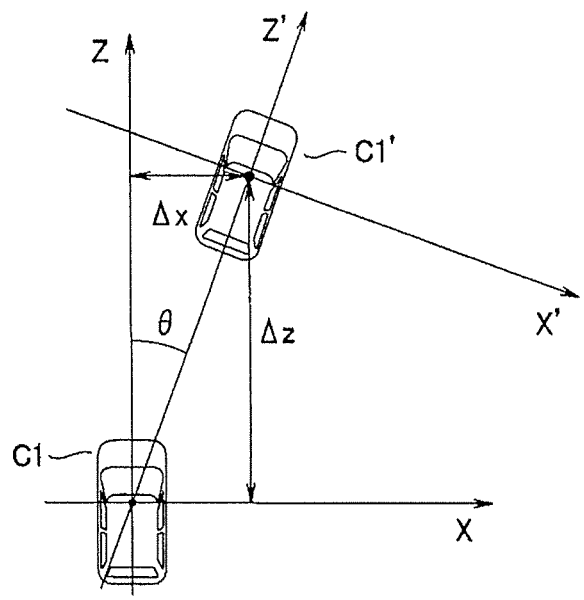
FIG. 2 is an explanatory diagram illustrating a vehicle movement amount.

More particularly, from a relationship illustrated in FIG. 2, on the basis of vehicle velocity V of an own vehicle C1 and a yaw angle θ determined by the yaw rate of the own vehicle C1, movement amounts Δx and Δz to an own vehicle C1' at a frame rate Δt (period of time until a captured image is updated by one frame) may be calculated using the following expressions (1) and (2).

$$\Delta x = V \cdot \Delta t \cdot \sin\theta \quad (1)$$

$$\Delta z = V \cdot \Delta t \cdot \cos\theta \quad (2)$$

Thereafter, the movement amounts Δx and Δz of the own vehicle may be subtracted from proposed points Pold (Xold, Zold), which are detected prior to previous frame, of the preceding vehicle, and coordinate transformation to a vehicle fixed coordinate system (X', Z') in a current frame may be performed to calculate coordinates of proposed points Ppre (Xpre, Zpre) of the preceding vehicle in the current frame, as represented by the following expressions (3) and (4).

$$X\text{pre} = (X\text{old} - \Delta x) \cdot \cos\theta - (Z\text{old} - \Delta z) \cdot \sin\theta \quad (3)$$

$$Z\text{pre} = (Z\text{old} - \Delta x) \cdot \sin\theta + (Z\text{old} - \Delta z) \cdot \cos\theta \quad (4)$$

For example, least-square method may be applied to the group of proposed points to determine a curve as represented by the following expression (5).

$$P = K1 \cdot Z^2 + K2 \cdot Z + K3 \quad (5)$$

Figure 3:
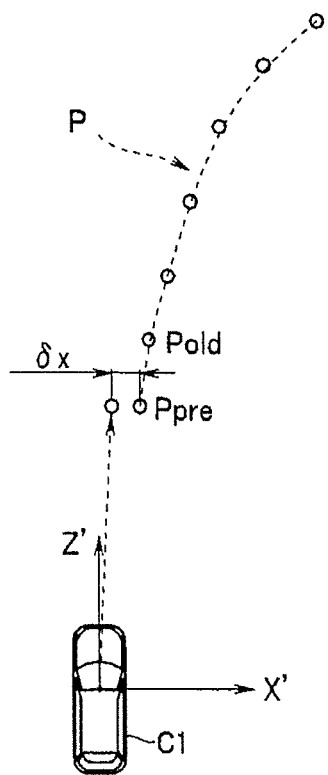
FIG. 3 is an explanatory diagram illustrating a traveling locus of a preceding vehicle.

The curve may be defined as a traveling locus P of the preceding vehicle as illustrated in FIG. 3. In the expression (5), a coefficient K1 denotes a curvature component of the traveling locus; a coefficient K2 denotes a yaw angle component of the traveling locus (a slope component of the traveling locus with respect to the own vehicle); and a coefficient K3 denotes a lateral position component of the traveling locus with respect to the own vehicle.

As described above, the follow-up control to follow the traveling locus of the preceding vehicle may adopt, as the control target point, the center position of the rear region of the preceding vehicle in the vehicle width direction to control the steering angle of the own vehicle. Accordingly, the controller 101 may correct the current steering angle by means of the steering controller 70 so as to allow the center position of the own vehicle in the vehicle width direction to coincide with the control target point, thereby controlling the follow-up traveling to follow the preceding vehicle. The steering control for the control target point may be performed mainly using a feedback control based on deviation δx between the control target point and the position of the own vehicle when advancing at the current steering angle.

For example, a feedforward steering amount based on the curvature K1 of the traveling locus of the preceding vehicle, and a feedback steering amount of deviation δyaw for allowing the yaw angle of the own vehicle to coincide with the yaw angle component K2 of the traveling locus may be added to a steering amount based on the deviation δx with respect to the control target point to allow for calculation of a target steering angle αref, as represented by the following expression (6):

$$\alpha\text{ref} = Gf \cdot \delta x + Gff \cdot K1 + Gy \cdot \delta\text{yaw} \quad (6)$$

where

Gf denotes a feedback gain for the deviation between the control target point and the position of the own vehicle when advancing at the current steering angle, Gff denotes a feedforward gain for the curvature of the traveling locus, and Gy denotes a feedback gain for a relative yaw angle between the traveling locus and the own vehicle.

The steering control for the target steering angle αref may be performed as a control for target steering torque based on the deviation between the target steering angle αref and a current actual steering angle αt. The control for the target steering torque may be performed specifically as an electric current control of the electric power steering motor. For example, the electric power steering motor may be driven by a drive current Im under proportional-integral-derivative (PID) control, as represented by the following expression (7):

$$Im = Kv \cdot (Gp \cdot (\alpha\text{ref} - \alpha t) + Gi \cdot \int(\alpha\text{ref} - \alpha t)dt + Gd \cdot d(\alpha\text{ref} - \alpha t)/dt) \quad (7)$$

where

Kv denotes motor-voltage-to-current conversion factor,
Gp denotes a proportional gain,
Gi denotes an integral gain, and
Gd denotes a derivative gain.

When the preceding vehicle is a vehicle smaller than the own vehicle in such a follow-up traveling to follow the preceding vehicle, the preceding vehicle is more likely to be affected by disturbance due to factors such as vehicle weight and gravity center, causing the lateral position of the vehicle to be varied at a high frequency and high amplitude. As a result, when the preceding vehicle is the vehicle smaller than the own vehicle, the preceding vehicle may travel in a meandering manner or may swerve toward a road shoulder or an opposite lane. Thus, the movement of the own vehicle may become oversensitive to follow the preceding vehicle, causing behaviors such as meandering and swerving to be more conspicuous, which may end up in giving a sense of anxiety to a driver.

To address this, as illustrated in FIG. 1, the traveling controller 100 may include, in addition to the controller 101 and the control target point setting unit 102, a dead zone setting unit 103 and a steering control amount correcting unit 104, thus suppressing the unnecessary behavior of the own vehicle caused by the behavior of the preceding vehicle, which allows a driver to rarely feel a sense of anxiety.

The dead zone setting unit 103 may set a width D of a dead zone for the steering control on the basis of shape data of the preceding vehicle. In an implementation of the technology, the dead zone setting unit 103 may determine whether the preceding vehicle is the vehicle smaller than the own vehicle on the basis of a relationship between the shape data of the preceding vehicle obtained from captured images of the camera 1 and corresponding shape data of the own vehicle stored in advance in a device of the own vehicle. When the preceding vehicle is the vehicle smaller than the own vehicle, the dead zone setting unit 103 may set the width D of the dead zone. As the relationship of shape data between the preceding vehicle and the own vehicle, ratios such as vehicle width ratio, area ratio (ratio between areas projected onto a plane where the vehicle width direction is the X-axis and the vehicle height direction is the Y-axis), and aspect ratio (vehicle height/vehicle width) may be used.

Figure 4:
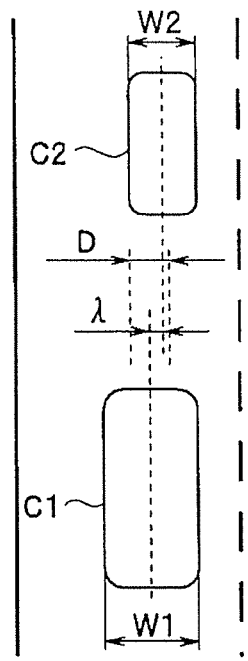
FIG. 4 is an explanatory diagram illustrating a dead zone for a steering control for the preceding vehicle.

More specifically, as illustrated in FIG. 4, when the dead zone setting unit 103 determines that a preceding vehicle C2 is the vehicle smaller than an own vehicle C1, the dead zone setting unit 103 may set the width D of the dead zone in a predetermined range around a center point of the control target point of the follow-up traveling to follow the preceding vehicle C2 at the time of the determination. Thus, even in a case where the preceding vehicle C2 is meandering, when deviation λ between the center point of the own vehicle C1 and the control target point is within the width D of the dead zone, the dead zone setting unit 103 may keep the steering amount of the own vehicle C1 without correction.

Figure 5:
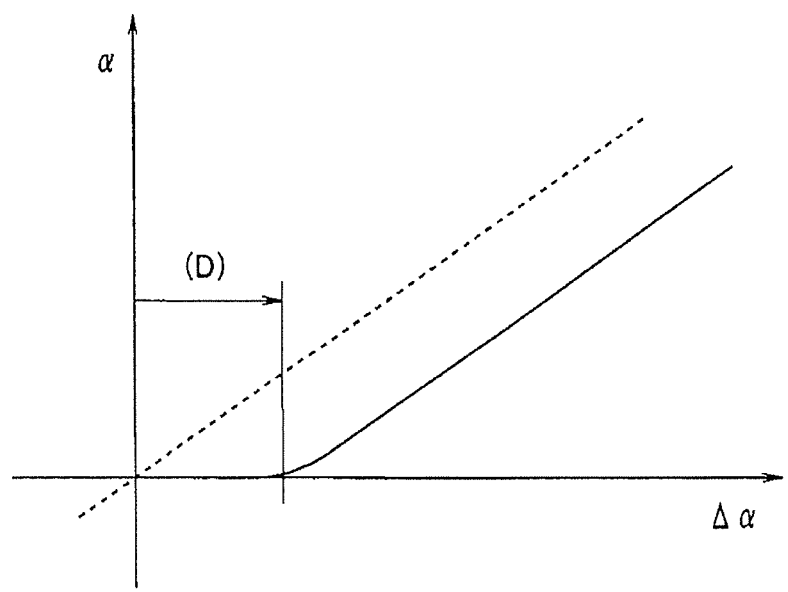
FIG. 5 is an explanatory diagram illustrating a corrected steering amount of an own vehicle with respect to a behavior of the preceding vehicle.

In other words, when the preceding vehicle C2 is equal to or larger than the own vehicle C1, the dead zone setting unit 103 may correct a steering amount α of the own vehicle C1 with respect to deviation Δα between the target steering angle αref and the actual steering angle αt, as indicated by a broken line in FIG. 5. The deviation Δα indicates a tracking deviation of the own vehicle. When the preceding vehicle C2 is the vehicle smaller than the own vehicle C1, the dead zone setting unit 103 may suppress the correction of the steering amount α of the own vehicle C1 with respect to the deviation Δα between the target steering angle αref and the actual steering angle αt within a region of dead zone (D), as indicated by a solid line in FIG. 5. Thus, the dead zone setting unit 103 may prevent an oversensitive reaction of the own vehicle.

In an implementation of the technology, the width D of the dead zone may be set on the basis of the vehicle width ratio of a vehicle width of the preceding vehicle to a vehicle width of the own vehicle. In other words, the dead zone setting unit 103 may calculate, as a vehicle width W2 of the preceding vehicle, a difference between a rightmost position and a leftmost position of the rear region of the preceding vehicle in the X-axis direction obtained from the captured images of the camera 1. Further, the dead zone setting unit 103 may calculate a coefficient Kd on the basis of the vehicle width ratio (W2/W1) of the vehicle width W2 to a vehicle width W1 of the own vehicle, with reference to a table, for example. The vehicle width W1 may be already known in advance. Thus, the dead zone setting unit 103 may set the width D of the dead zone by multiplying the vehicle width W2 of the preceding vehicle by the coefficient Kd.

Figure 6:
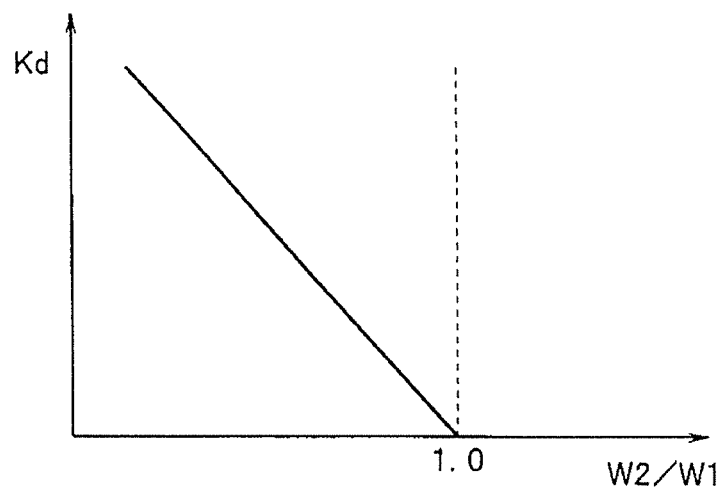
FIG. 6 is an explanatory diagram illustrating a setting of the dead zone with respect to a vehicle width ratio of the preceding vehicle to the own vehicle.

FIG. 6 illustrates an example of a table property in which the dead zone is set. In this table, the property is set such that, as the vehicle width ratio (W2/W1) decreases, i.e., as the preceding vehicle becomes smaller than the own vehicle, the coefficient Kd increases. The coefficient Kd is set such that Kd is equal to about 0.8 (Kd≈0.8) at the maximum, for example. When the vehicle width ratio (W2/W1) is equal to or greater than 1.0 (W2/W1≥1.0), i.e., when the preceding vehicle is equal to or larger than the own vehicle, Kd is equal to zero (Kd=0), which means that there is no substantial dead zone.

It is to be noted that the table of FIG. 6 sets the coefficient Kd on the basis of the vehicle width ratio (W2/W1) for the sake of easy description; however, a value obtained in advance (width D of the dead zone) may also be stored directly in the table, since the vehicle width W1 of the own vehicle is an already known constant. The value to be stored in the table may be obtained by multiplication of the vehicle width W2 of the preceding vehicle by a value of the corresponding coefficient Kd on the table. The vehicle width W2 of the preceding vehicle may be obtained by reverse operation from a reference parameter (vehicle width ratio W2/W1).

While, in the table of FIG. 6, the coefficient Kd is set on the basis of the vehicle width ratio (W2/W1), the coefficient Kd may also be set on the basis of the vehicle width W2 of the preceding vehicle. In other words, the vehicle width of the own vehicle is already known, and thus detection of the vehicle width of the preceding vehicle makes it clear as to whether the preceding vehicle is smaller than the own vehicle. Therefore, the width of the dead zone may also be set unequivocally from the shape data of the preceding vehicle.

When the preceding vehicle is swerving toward a road shoulder or an opposite lane, the steering control amount correcting unit 104 may correct a steering control amount for the target steering angle to suppress the unnecessary behavior of the own vehicle caused by the behavior of the preceding vehicle. The correction of the steering control amount is a correction directed to reducing the steering control amount, using a correction coefficient Kα (Kα≤1.0) that is set depending on the deviation Δα between the target steering angle αref and the actual steering angle αt.

In this case, whether the preceding vehicle is swerving may be determined from a lateral position of the preceding vehicle with respect to the center position of a traveling lane, when a lane line such as a white line is recognizable. In contrast, when the lane line such as the white line is not recognizable as a result of the visual field of the camera 1 being limited by the preceding vehicle during traveling in traffic jam or in other situations, the swerving may be determined by means of factors such as the actual steering angle and the deviation between the target steering angle and the actual steering angle. Under a common traveling environment, a traveling lane width and the maximum value of the steering angle within the traveling lane are obtainable as already-known values. Thus, when the actual steering angle and the deviation between the target steering angle and the actual steering angle exceed predetermined threshold values, it is possible to determine that the preceding vehicle is swerving, and that the own vehicle is also swerving while following the preceding vehicle.

Figure 7:
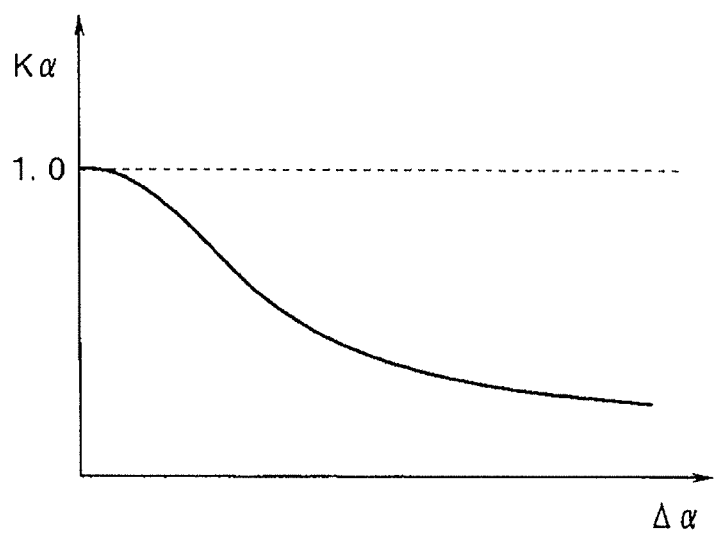
FIG. 7 is an explanatory diagram illustrating a correction coefficient of a steering control amount.

Further, the correction coefficient Kα may be set with reference to a property table as illustrated in FIG. 7, for example. In an example of FIG. 7, the property is set such that, as the deviation Δα between the target steering angle αref and the actual steering angle αt increases from a small region of the deviation Δα, the correction coefficient Kα decreases from 1.0 (Kα=1.0) monotonically. More specifically, a reduction correction of the steering control amount with the correction coefficient Kα may be performed, for example, by multiplying the target steering angle αref according to the foregoing expression (6), or the drive current Im of the electric power steering motor according to the foregoing expression (7) by the correction coefficient Kα. Thus, the reduction correction may suppress the unnecessary behavior of the own vehicle by reducing the steering angle or the steering force during the follow-up traveling.

More specifically, the correction coefficient Kα may be used mainly for multiplications of the feedback gain Gf. The correction coefficient Kα may also be used, on an as-needed basis, for multiplications of gains such as the feedback gain Gy and a control gain in the PID control for the target steering torque. The correction coefficient Kα may be used for the multiplications to reduce each of the gains, thus performing reduction correction of the target steering angle αref and the drive current Im of the electric power steering motor. The feedback gain Gf denotes the feedback gain for the deviation between the control target point and the position of the own vehicle at the target steering angle αref. The feedback gain Gy denotes a feedback gain for a relative yaw angle between the traveling locus and the own vehicle. Non-limiting examples of the control gain in the PID control for the target steering torque may include the proportional gain Gp, the integral gain Gi, and the derivative gain Gd.

Figure 8:
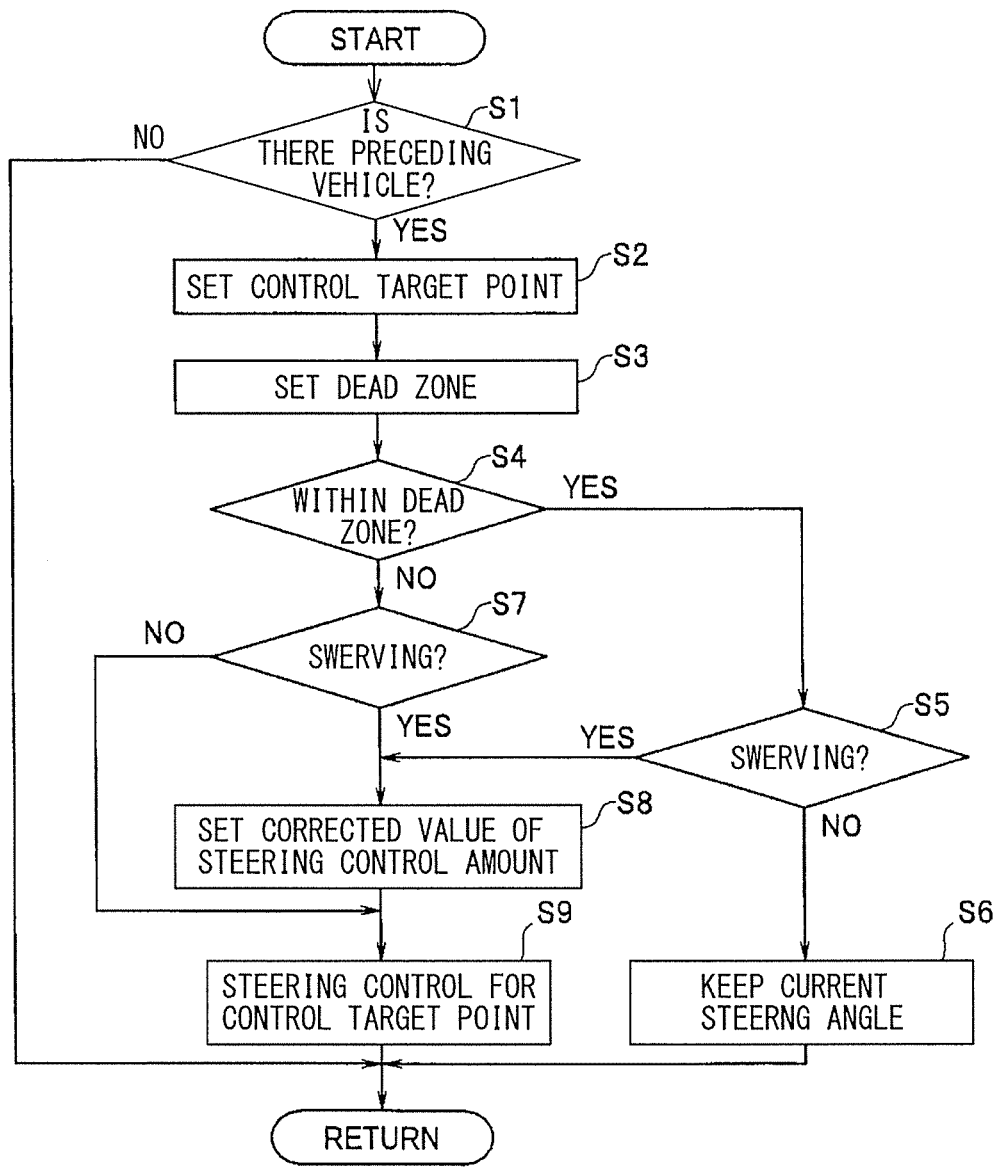
FIG. 8 is a flowchart of a follow-up traveling control.

Next, description is given, with reference to the flowchart of FIG. 8, of program processing of the follow-up traveling control to follow the preceding vehicle performed in the traveling controller 100.

In the follow-up traveling control to follow the preceding vehicle, in first step S1, checking may be made as to whether there is a preceding vehicle recognized in a predetermined range ahead of the own vehicle. When no preceding vehicle is recognized, the flow may skip this processing. When, the preceding vehicle is recognized, the flow may proceed from step S1 to step S2, in which the center position of the rear region of the preceding vehicle may be set as the control target point of the follow-up traveling to follow the preceding vehicle.

Next, the flow may proceed to step S3, in which the vehicle width W2 of the preceding vehicle may be calculated to set the width D of the dead zone by, for example, referring to the table based on the vehicle width ratio W2/W1 of the vehicle width W2 of the preceding vehicle to the vehicle width W1 of the own vehicle which is stored in advance in a device (see FIG. 6). Then, in step S4, checking may be made as to whether the deviation between the control target point and the center position of the own vehicle is within the dead zone.

When the deviation between the control target point and the center position of the own vehicle is within the dead zone, the flow may proceed from step S4 to step S5 to check whether the preceding vehicle is swerving toward a road shoulder or an opposite lane. When the deviation between the control target point and the center position of the own vehicle is within the dead zone, and the preceding vehicle is not swerving, the flow may proceed from step S5 to step S7 to keep the current steering angle.

When the deviation between the control target point and the center position of the own vehicle is outside the dead zone, the flow may proceed from step S4 to step S7 to check whether the preceding vehicle is swerving. When the preceding vehicle is not swerving, the flow may proceed from step S7 to step S9 to perform the follow-up traveling control so as to allow the center position of the own vehicle in the vehicle width direction to coincide with the control target point. The follow-up traveling control at this time may be performed using the steering control for the control target point, i.e., mainly using the steering control that corrects the steering angle on the basis of the deviation between the control target point and the center position of the own vehicle.

When the preceding vehicle is determined as swerving in step S7, the flow may proceed from step S7 to step S8 to set the correction coefficient Kα of the steering control amount, for example, with reference to the table based on the deviation Δα between the target steering angle αref for the control target point and the current actual steering angle αt (see FIG. 7). Then, in step S9, the steering control for the control target point may be performed on the basis of the steering control amount having been subjected to the reduction correction with the correction coefficient Kα.

As described above, according to an implementation of the technology, it is possible to suppress unnecessary behav-iors of the own vehicle caused by behaviors of the smaller preceding vehicle, such as meandering and swerving, during the follow-up traveling using, as the control target point, the set position of the preceding vehicle in the vehicle width direction. Thus, a driver rarely feels a sense of anxiety.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle traveling control apparatus for controlling an own vehicle to follow a proceeding vehicle, comprising:
a first setting unit that sets a control target point on the preceding vehicle for controlling the own vehicle to follow the preceding vehicle;
a correcting unit that corrects an amount of a steering control to control the own vehicle based on deviation between an actual steering angle and a target steering angle that brings that controls a control point of the own vehicle to trace a travel locus of the control target point of the preceding vehicle; and
a second setting unit that sets an adjusting value based on a shape of the preceding vehicle for adjusting the amount of the steering control, wherein
the correcting unit sets the amount of the steering control based on the adjusting value and the deviation between the actual steering angle and the target steering angle.

2. The vehicle traveling control apparatus according to claim 1, wherein the shape is a width of the preceding vehicle.

3. The vehicle traveling control apparatus according to claim 2, wherein
the second setting unit determines that the width of the preceding vehicle is smaller than a width of the own vehicle, and
responsive to determining that the width of the preceding vehicle is smaller than the width of the own vehicle, the second setting unit sets the adjusting value for adjusting the amount of the steering control.

4. A vehicle traveling control apparatus comprising:
a first setting unit that sets a control target point on the preceding vehicle for controlling the own vehicle to follow the preceding vehicle;
a second setting unit that sets a range smaller than a first width of the own vehicle as a dead zone based on a second width of the preceding vehicle, when the second width is smaller than the first width; and
a control unit that:
determines at least one that (1) a first deviation being deviation between a center point of the own vehicle and the control target point is within the dead zone, and (2) the first deviation is outside the dead zone;
when the first deviation is outside the dead zone, executes a correction of a current steering angle of the own vehicle for controlling the own vehicle to follow the preceding vehicle; and
when the first deviation is within the dead zone, keeps the current steering angle without executing the correction.

5. The vehicle traveling control apparatus according to claim 4, wherein when the first deviation is outside the dead zone, the control unit further determines that the preceding vehicle is swerving toward an side end of a traveling road, and responsive to the determination that the preceding vehicle is swerving toward the side end of the traveling road, the control unit reduces a steering control amount for controlling the own vehicle based on a second deviation being deviation between an actual steering angle and a target steering angle, the target steering angle being for controlling the own vehicle to trace a travel locus of the control target point of the preceding vehicle.

* * * * *